INVENTORS.
ROBERT W. KING
ROBERT K. MITCHELL
WILLIAM W. VOGELHUBER
BY Gray, Mase, and Dunson, Attys.

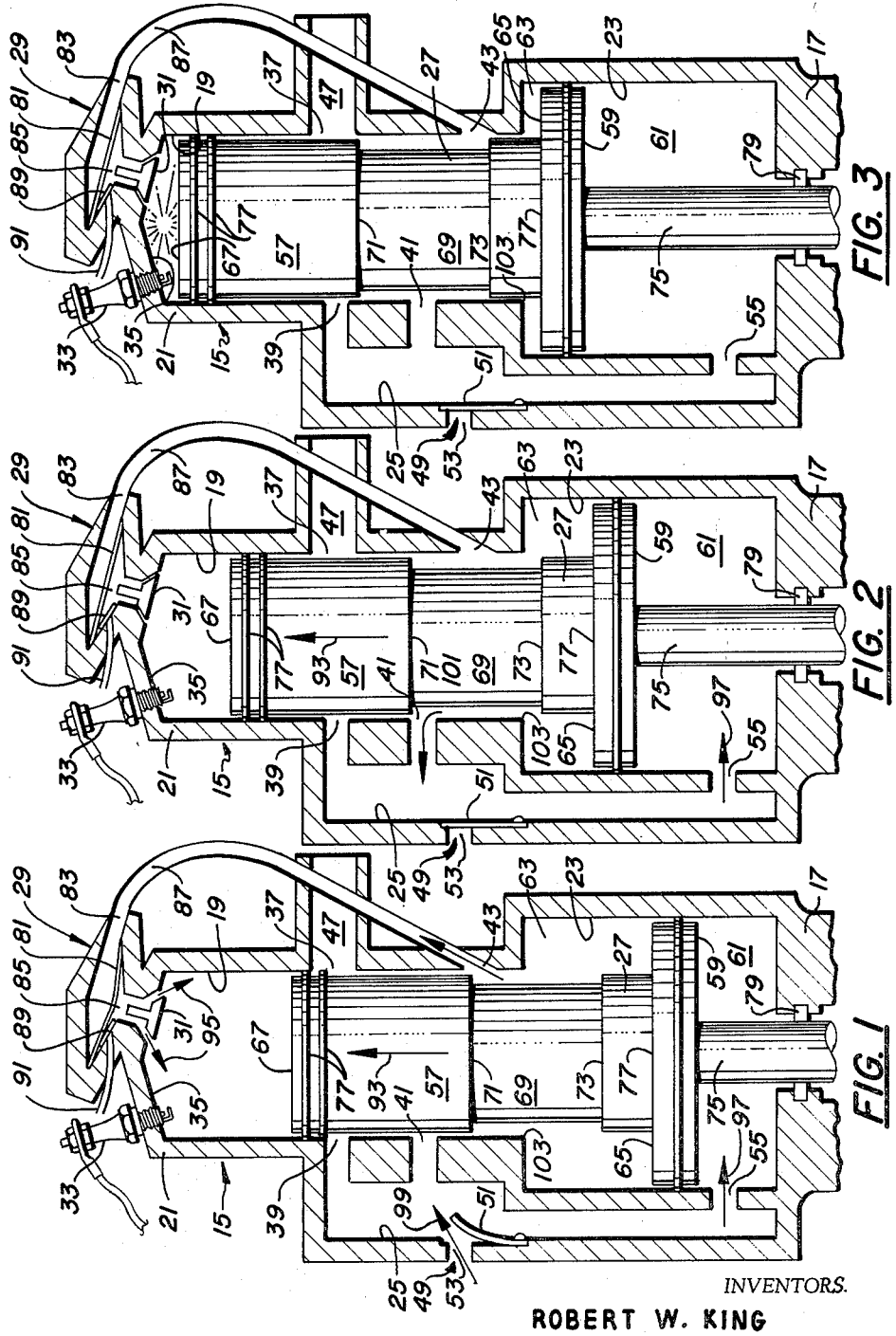

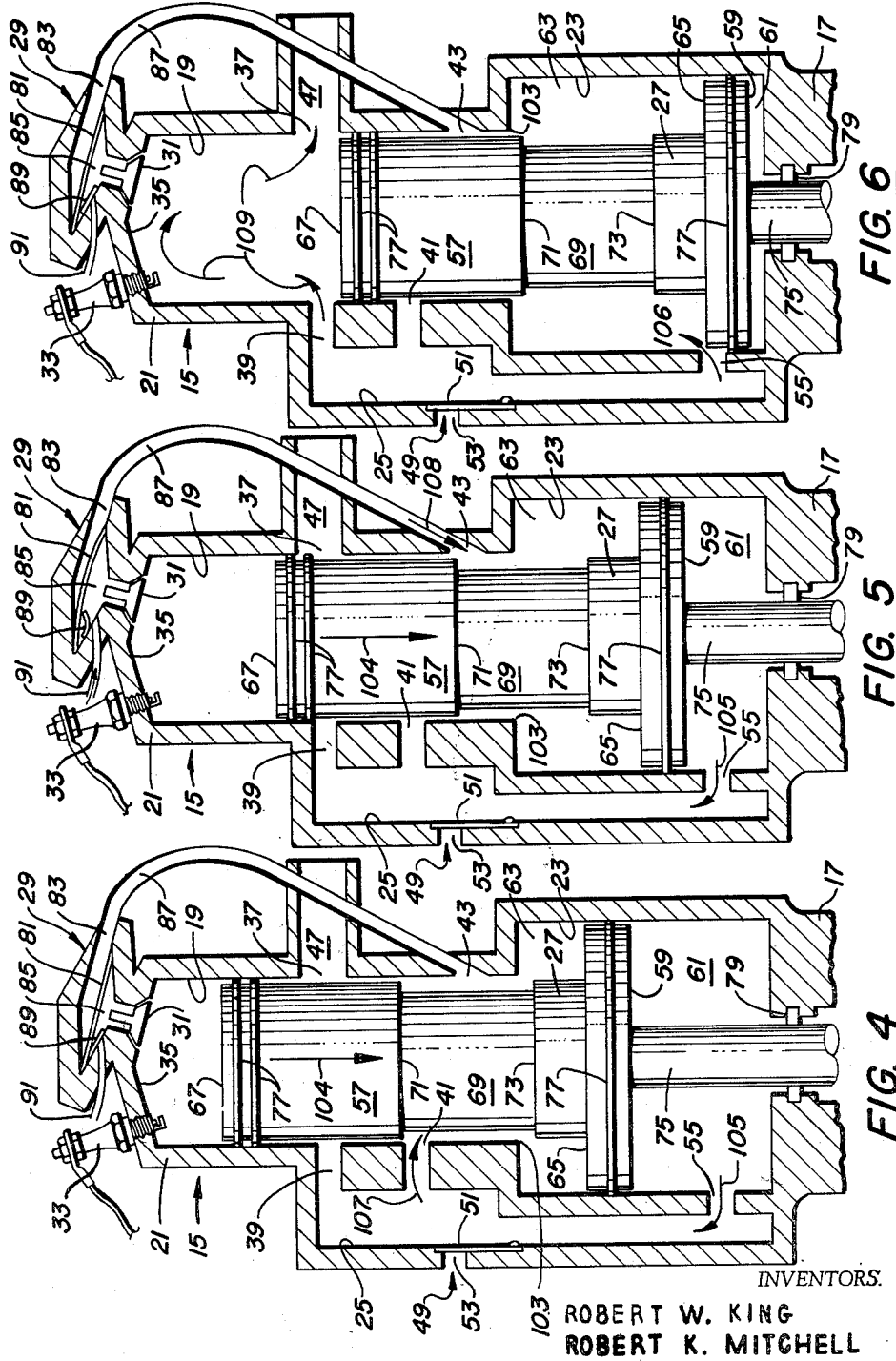

United States Patent Office 3,159,149
Patented Dec. 1, 1964

3,159,149
AIR SUPPLY AND CONTROL SYSTEM FOR
FREE-PISTON ENGINE
Robert W. King, Robert K. Mitchell, and William W. Vogelhuber, Columbus, Ohio, assignors, by mesne assignments, to The Battelle Development Corporation, Columbus, Ohio, a corporation of Delaware
Filed Aug. 16, 1962, Ser. No. 217,455
7 Claims. (Cl. 123—46)

This invention relates to a control system for free-piston internal-combustion engines. More particularly, it relates to an air pressurization and porting construction for supplying scavenge air, air pressure for fuel injection, and air pressure for piston-stroke control.

An important method of increasing the efficiency of internal-combustion engines is to minimize the number of moving parts. If many moving parts, such as cams, gears, levers, valves, etc., are required to control and keep the engine operating, much of the engine power is used in moving these supporting mechanisms. The reliability of a free-piston engine is also reduced as the number of moving parts is increased, since there are more parts that can break and wear out. According to this invention, a construction is provided that significantly eliminates many moving parts that are common to conventional engines.

The ordinary free-piston engines require scavenge air, fuel supply (by injection or other means), and piston-stroke control. In the past, separate means have been provided to furnish these necessary requirements. This invention provides these requirements to the engine by an improved engine construction that combines the movements of the free piston with a unique porting arrangement and location.

One feature of this invention is that air is supplied for scavenging the engine, injecting fuel, and controlling piston stroke with only one valve. The retention and release of air at other points in the air system are accomplished by piston movement relative to selectively positioned ports. The same air that is used for fuel injection and piston-stroke control is eventually used as scavenge and combustion air for the combustion cylinder.

Briefly, this invention comprises apparatus including a porting system in combination with a free-piston engine, wherein the piston of the engine pressurizes air and opens and closes the ports to provide pressurized air for controlling length of piston stroke, fuel injection, scavenge air and combustion air.

In addition to the advantages of increased efficiency and reliability of the engine brought about by this invention, another advantage is that fuel is pumped and injected into the combustion cylinder of the engine by means integral with the engine and directly timed by engine operation. The efficient reuse of a single body of air for a number of purposes is clearly advantageous, the most obvious advantage being that about ⅔ less air is moved or pumped by the engine; thus less of the engine power is wasted on auxiliary requirements. Still other advantages of the invention are apparent from the following specification, the drawings, and the claims herein set forth.

In the drawings:

FIGS. 1–6 are sectional views through a free-piston engine, showing one embodiment of the invention, with the free-piston at progressive positions during a complete engine cycle;

Figure 15:
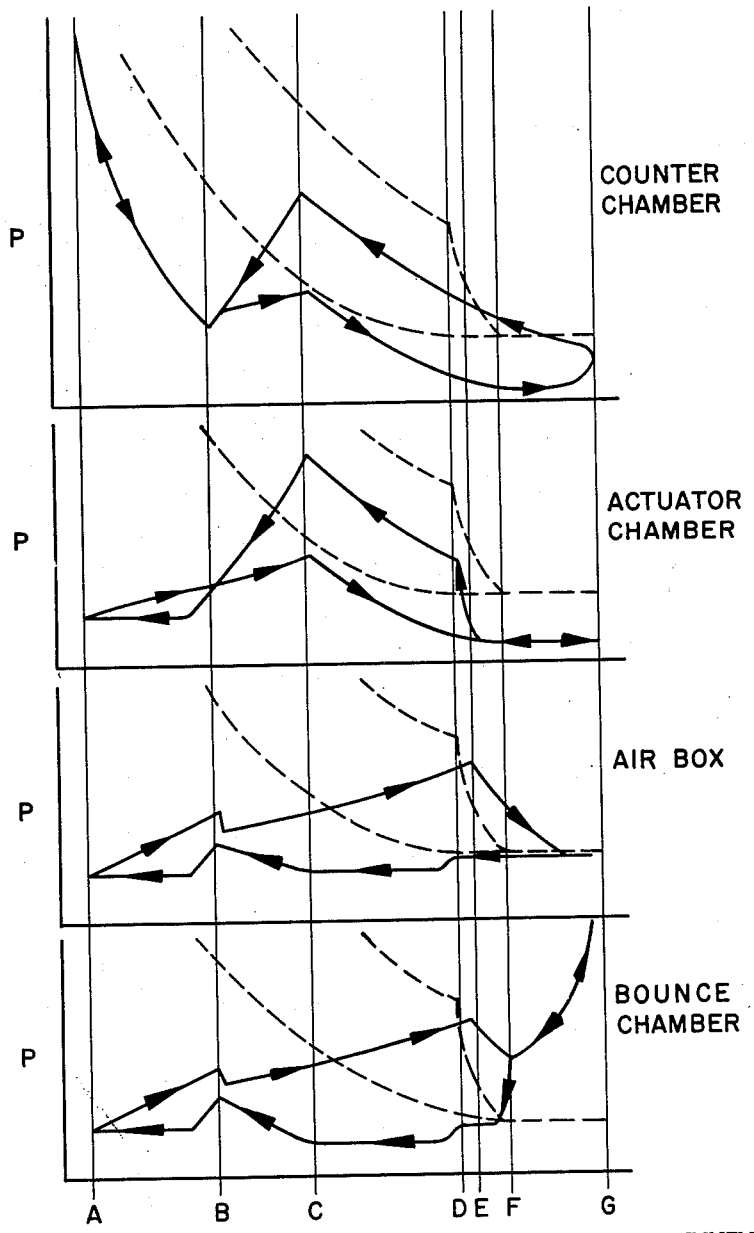
Figure 16:
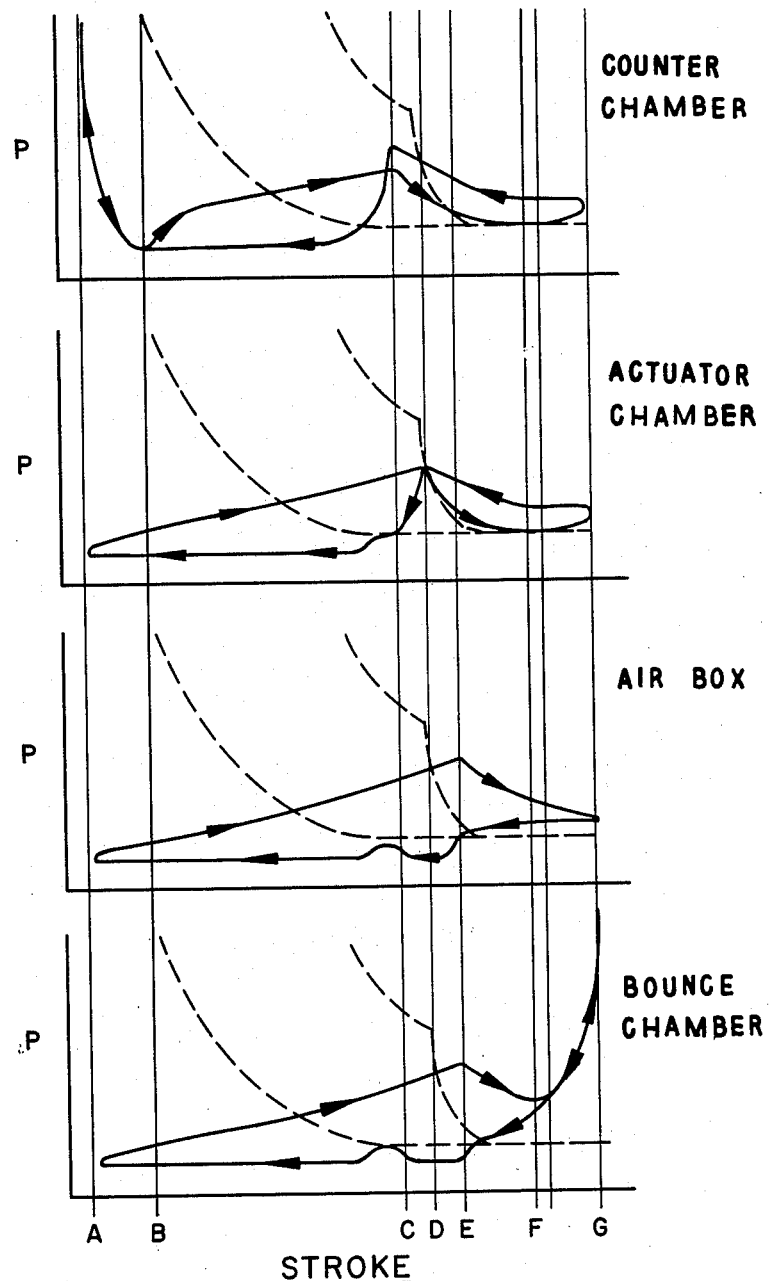

FIG. 15 shows a group a group of curves, based on the engine construction shown in FIGS. 1–6, indicating the pressure variations in various engine compartments with respect to free-piston position or stroke; and FIG. 16 shows a group of curves, based on the engine construction shown in FIGS. 7–13, indicating the pressure variations in various engine compartments with respect to free-piston position or stroke.

In the drawings, the same reference numerals are applied to identical parts in all embodiments and such identically numbered parts are substantially identical in structure, function, and operation. Therefore, to eliminate confusing duplication, these parts, their interrelationship and function will be described only in conjunction with a single embodiment, such description applying to all embodiments where these parts appear.

Referring to the embodiment of FIGS. 1–6, a two-stroke cycle, free-piston internal-combustion engine 15 includes a composite frame structure 17, having a power cylinder 19, cylinder head 21, control cylinder 23, and air box 25.

Reciprocally mounted within the frame 17 is a piston 27. Fuel injection apparatus 29 is mounted on the engine 15 with a fuel injector and dispersion valve 31 positioned in the cylinder head 21. An ignitor 33, such as a spark plug, is also disposed in the cylinder head 21.

In progressively spaced position from the head end 35, the combustion cylinder 19 is provided with an exhaust port 37, an intake port 39, a spill port 41, and a timing port 43. Although only one of each type of port is shown in FIGS. 1–6, there may be more than one of each of the above-mentioned ports. The intake port 39 and spill port 41 communicate with air box 25 that is attached to, or constructed as a part of, the frame 17. The exhaust port 37 opens into an exhaust passage 47 that communicates with the atmosphere.

The air box 25 is provided with a low-inertia check valve 49, such as one having a reed element 51. The inlet aperture 53 of the valve 49 is undercovered by flexure of the reed element 51 when pressure in the air box 25 is less than atmospheric. Whenever the sum of the pressure in the air box 25 and the spring force of the reed 51 exceeds atmospheric pressure, check valve 49 will close. The air box 25 also communicates with the control cylinder 23 by means of a port 55.

The piston 27 is formed with a minor-diameter contact portion such as power piston 57, which is adapted to reciprocate in the power cylinder 19, and major-diameter portion such as control piston 59, which is adapted to reciprocate in the control cylinder 23. Major-diameter portion 59 divides control cylinder 23 into a bounce chamber 61 and a counterchamber 63, which alternately increase and decrease in volume when piston 27 reciprocates. For purposes of description, minor-diameter portion 57 may be considered to extend from one side 65 of the major-diameter portion 59 to the head end 67 of piston 27. For a portion of its length, the minor-diameter portion 57 is formed with a recessed-diameter portion 69, which continues from a leading edge 71 to a trailing edge 73. Piston 27 may have a connecting rod 75 or other suitable energy output means connected to the major-diameter portion 59. Sealing means, such as piston rings 77—77, are provided on the piston 27 to maintain the pressure conditions in each chamber. A seal 79 is also provided around the connecting rod 75.

A simplified fuel injection apparatus 29 is shown having a pressure-actuated diaphragm 81 that divides the fuel injector into an actuator chamber 83 and a pump chamber 85. When the pressure in the conduit 87 that communicates between the timing port 43 and the actuator chamber 83 is about maximum, the diaphragm 81 is flexed to decrease the size of the pump chamber 85, increasing the pressure therein, opening the dispersion valve 31 and injecting fuel into the power cylinder 19. When the pressure in actuator chamber 83 and conduit 87 is about minimum, the diaphragm 81 is flexed to enlarge the pump chamber 85, decreasing the pressure therein and opening a check valve 89, causing fuel to enter the pump chamber 85 through a fuel line 91.

The operation of the engine and air system are as follows:

The general operation of the engine 15 is in accordance with the usual operation of two-stroke-cycle engines, with the exception that piston 27 is returned on the compression stroke by compressed gas in the bounce chamber 61 beneath the major-diameter portion 59 of piston 27.

FIG. 15 shows a group of four curves that indicate the pressure in the various chambers during the reciprocation of the piston 27. The abscissa in each curve represents piston stroke and the ordinate corresponds to pressure. Each of the curves is shown in relation to the pressure curve of the combustion chamber 19, represented by the broken line. Various positions in the stroke are marked by the letters A through G, with A being top dead point position and G being bottom dead point position. Reference to FIG. 15 will aid in understanding the various air transfers that occur in the engine 15 as piston 27 reciprocates. No units are indicated on the curves since they are intended to show the relative pressures in each chamber.

Beginning at the position of piston 27 as shown in FIG. 1, the piston 27 is moving in the direction of the arrow 93 on the compression stroke. In FIG. 15, the direction of the compression stroke is from G toward A and the position of the piston 27 corresponding to FIG. 1 is at about D, which marks the opening and closing of the exhaust port 37 and timing port 43. When the piston 27 is moving on the compression stroke, the exhaust port 37 closes and the timing port 43 opens. The pressure in the counterchamber 63 is rising (as shown in FIG. 15) and the opening of the timing port 43 by recessed portion 69 of piston 27 connects the counterchamber 63 and actuator chamber 83 so that the pressure in actuator chamber 83 rises. Increasing the air pressure in actuator chamber 83 flexes diaphragm 81, reducing the size of pump chamber 85 injecting fuel, as indicated by the arrows 95—95. As the piston 27 continues the compression stroke, the major-diameter portion 59 increases the volume of bounce chamber 61 and this increasing space is filled with air from air box 25 and indicated in FIG. 1 by the arrow 97. The pressure in air box 25 is thus decreased in an amount sufficient to open valve 49, allowing the air to enter inlet aperture 53 of valve 49, as indicated by arrow 99 in FIG. 1. The curve for air box 25 and bounce chamber 61 of FIG. 15 show an initial drop at about position D until valve 49 opens, and then steady pressure as air enters air box 25 while valve 49 is open.

The position of piston 27 in FIG. 2 corresponds to about the location of C in FIG. 15. Piston 27 is still on the compression stroke, as indicated by the arrow 93. The leading edge 71 of recessed portion 69 has moved past and has opened the spill port 41 so that communication is established between air box 25 and counterchamber 63, releasing the pressure that has accumulated therein. Valve 49 closes when spill port 41 opens. Pressure in the actuator chamber 83 and counterchamber 63 decreases while pressure increases in the air box 25 and bounce chamber 61. Air passing through spill port 41 is indicated by the arrow 101 and continuation of air passing from the air box 25 to bounce chamber 61 is indicated by arrow 97.

Between the two positions of the piston 27 shown in FIGS. 2 and 3, the trailing edge 73 of recessed portion 69 moves opposite the lower edge 103 of the power cylinder 19, sealing off the counterchamber 63. At this point (shown by the location of B in FIG. 15), the pressure in the counterchamber 63 begins the rise. The pressure is reduced in the actuator chamber 83, air box 25, and bounce chamber 61, since they are in communication and the bounce chamber 61 is increasing in volume. Eventually, the valve 49 opens again allowing air to enter air box 25 until the piston 27 reaches top dead point at which point valve 49 closes. Top dead point position is shown in FIG. 3 and by A in FIG. 15.

After combustion of the fuel and air mixture, the piston 27 starts downward on the power stroke, this movement is indicated in FIG. 4 by the arrow 104. The valve 49 closes and the pressure begins to rise in the bounce chamber 61, air box 25, and actuator chamber 83. The pressure in these three chambers rises, since the available bounce chamber volume is greater than the available counterchamber volume. The bounce chamber volume is larger than the counterchamber volume because the minor-diameter portion 57 of the piston 27 is larger in diameter than the piston rod 75 and occupies more space in the control cylinder 23. The counterchamber pressure drops off until the trailing edge 73 of recessed portion 69 moves below the lower edge 103 of power cylinder 19. This position of the piston 27 is shown in FIG. 4. At this time, air is being transferred from the bounce chamber 61 to the air box 25 (as indicated by the arrow 105) and from the air box 25 through the spill port 41, along recessed portion 69 to the counterchamber 63 (as indicated by the arrow 107).

Near midstroke (location C in FIG. 15 and shown by FIG. 5), communication between air box 25 and counterchamber 63 is interrupted when the leading edge 71 of recessed portion 69 moves past the spill port 41. After spill port 41 is closed, the pressure in counterchamber 63 and actuator chamber 83 decreases. Decreasing pressure in the actuator chamber 83 (the air movement being indicated by arrow 108 in FIG. 5) causes diaphragm 81 to flex, enlarging pump chamber 85, opening valve 89, and fuel enters chamber 85 from fuel line 91. The bounce chamber 61 and air box 25, in the meantime, are increasing in pressure.

Location D on FIG. 15 marks the point at which exhaust port 37 is opened and shortly thereafter, at location E, intake port 39 is opened. Both exhaust ports 37 and intake port 39 are opened by head end 67 of piston 27. Almost simultaneously with the opening of intake port 39, timing port 43 is closed by leading edge 71 of recessed portion 69. Opening of intake port 39 releases the pressurized air from air box 25 to power cylinder 19, scavenging cylinder 19 (indicated by arrows 109—109 in FIG. 6) and providing a fresh charge of air for the next compression stroke. As indicated in FIG. 15, the pressure in air box 25 and bounce chamber 61 drops off after intake port 39 open at E.

Air from bounce chamber 61 is forced through air box 25 into power cylinder 19 until the major-diameter portion 59 closes port 55 (indicated by F in FIG. 15). At this point, pressure in bounce chamber 61 rises sharply to provide rebound energy for the compression stroke of piston 27.

At bottom dead point (the position shown in FIG. 6, and indicated by G in FIG. 15), the major-diameter portion 59 moves past port 55 and the pressurized air stored in air box 25 forces air into counterchamber 63 (indicated by arrow 106 in FIG. 6). This equalizes the pressure in air box 25 and counterchamber 63 at the bottom dead point position.

As the piston 27 returns on the compression stroke (between FIGS. 6 and 1), pressure in bounce chamber 61 drops (G to F in FIG. 15), and pressure in counterchamber 63 rises. Finally, the position of FIG. 1 is reached and the cycle is repeated.

FIGS. 7–13 show a second construction of the apparatus quite similar to the construction of FIGS. 1–6. The essential difference is a re-location of the fuel-injection apparatus 29 and elimination of the recessed portion 69 of piston 27 and elimination of spill port 41. Counterchamber 63 is sealed off from power cylinder 19 by means of seal 113 provided around minor-diameter portion 57 of piston 27. A relief passage 115 is provided in cylinder 23, so that air can pass around major-diameter portion 59 of piston 27 during a portion of both the compression and power stroke.

Figure 7:
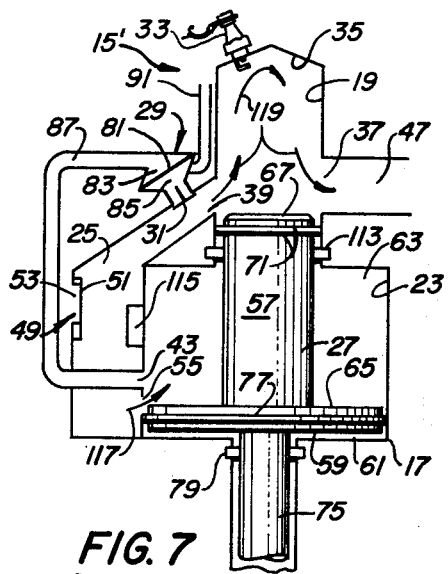
FIGS. 7–13 are sectional views through the free-piston engine, showing another embodiment of the invention, with the free-piston at progressive positions during a complete engine cycle.

The operation of the engine 15' and air system of FIGS. 7–13 is as follows:

FIG. 7 shows the piston 27 essentially at bottom dead point position. This position of the piston corresponds to the location of G in FIG. 16. At bottom dead point position, major-diameter portion 59 of piston 27 seals off the bounce chamber 61, providing a compressed cushion of air for rebounding piston 27 on the compression stroke. The major-diameter portion 59 has passed by port 55 and air enters the counterchamber 63 foam air box 25, as indicated by arrow 117. This air replaces air that was transferred to the bounce chamber 61 from the counterchamber 63 on the previous stroke. Both the inlet port 39 and exhaust port 37 are open and air moves from air box 25 through power cylinder 19, as indicated by arrows 119—119.

Figure 14:
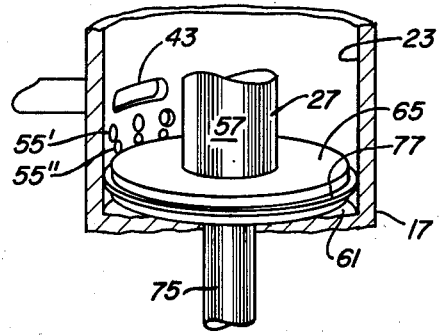
FIG. 14 shows an enlargement of a preferred embodiment of a port construction for the engine shown in FIGS. 7–13.

Referring to FIG. 14, port 55 has a specialized construction, being divided into two groups of ports 55' and 55". The ports 55' are larger than ports 55", and this group of ports is more useful than a single port 55. The use of a plurality of ports prevents immediate mixing when, on the compression stroke, the bounce chamber 61 first communicates with air box 25. Bounce chamber pressure, being higher than the air box pressure, supplies air to the air box through smaller ports 55' since they are uncovered first by the major-diameter portion 59 of piston 27. This port construction maintains pressure in air box 25 high enough so that air is continually supplied to power cylinder 19, until inlet port 37 closes. If only one single large bounce port 55 were present, much of the air in air box 25 would be drawn back into bounce chamber 61 before intake port 37 closed, reducing the scavenging time of power cylinder 19 and preventing a full charge of fuel from being supplied to power cylinder 19. Simply relocating port 55 to a higher position would not accomplish the desired results, since this would enlarge bounce chamber 61 and shorten the power stroke of the engine.

Figure 8:
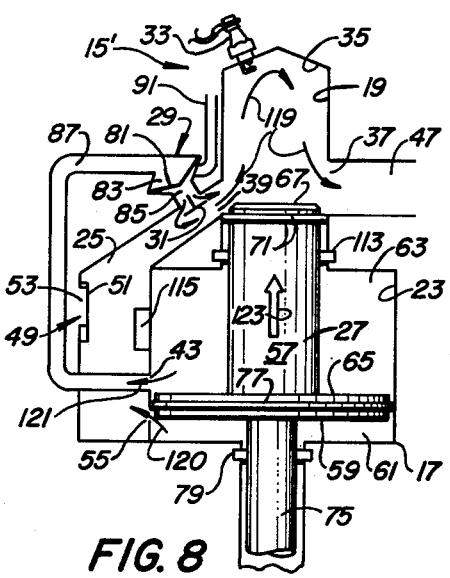

FIG. 8 shows piston 27 at a point where the major-diameter portion 59 has passed the smaller ports 55", so that the initial communication between air box and bounce chamber has been established. As communication between the air box 25 and bounce chamber 61 is first established through ports 55", air flows from the bounce chamber 61 to the air box 25 as indicated in FIG. 8 by the arrow 120. Larger ports 55' are still covered by the major-diameter portion 59. Movement of the major-diameter portion 59 from bottom dead point to the position shown in FIG. 8 begins to compress the air in the counterchamber 63, so that a surge of pressure occurs at port 43 (shown by arrow 121) increasing the pressure in actuator chamber 83 and flexing diaphragm 81 to inject fuel into air box 25 adjacent to inlet port 37, so that the fuel is carried with the air from the air box into power cylinder 19. Movement of the piston is indicated by arrow 123.

Figure 9:
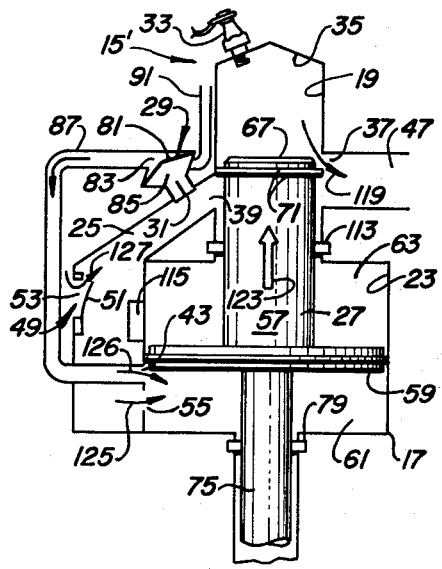

FIG. 9 shows piston 27 moved in the direction of arrow 123 a little further on the compression stroke and corresponds to the location of E in FIG. 15. At this point in the compression stroke, the inlet port 37 is closed by the minor-diameter portion 57 of piston 27. Bounce chamber 61 communicates through port 55 with air box 25 and through port 43 and duct 87, with the actuator chamber 83. Bounce chamber 61 is increasing in size, drawing air from the air box 25 and decreasing the pressure in air box 25 (as indicated by the arrow 125) and in actuator chamber 83 (as indicated by the arrow 126). The reduced pressure in air box 25 causes valve 49 to open, admitting air from the atmosphere into air box 25 (as indicated by arrow 127). Reduction of the pressure in actuator chamber 83 causes diaphragm 81 to flex and a charge of fuel is admitted to fuel injector 29.

Figure 10:
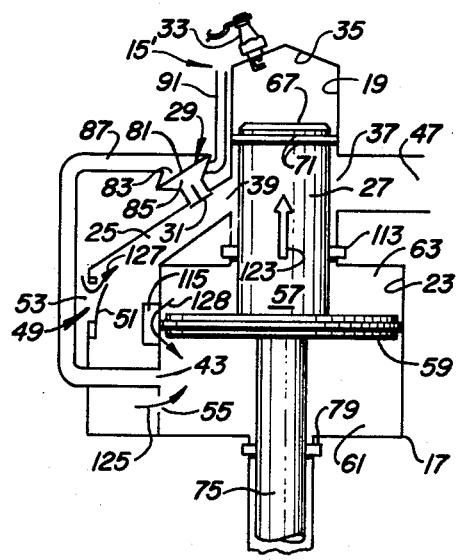
Figure 11:
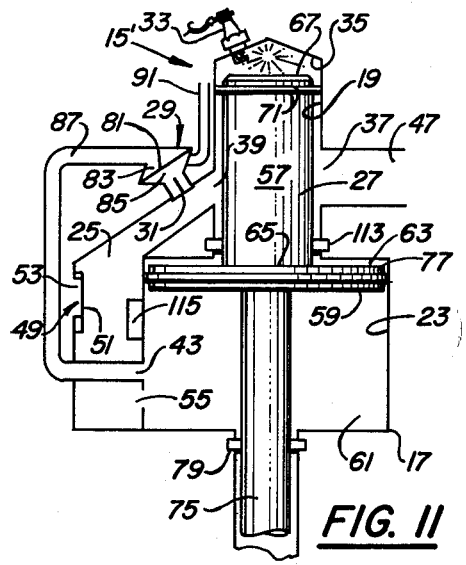

When piston 27 reaches the position shown in FIG. 10, major-diameter portion 59 occupies a position opposite relief passage 115, establishing communication between counterchamber 63 and bounce chamber 61. The air compressed in counterchamber 63 passes through relief passage 115 (as indicated by the arrow 128) into bounce chamber 61. Since minor-diameter portion 57 of piston 27 is larger than piston rod 75, the counterchamber is smaller than the bounce chamber, so that even though air is passing from the counterchamber 63 to bounce chamber 61, air is still being drawn from air box 25, holding valve 49 open. Valve 49 may possibly close momentarily when communication between counterchamber 63 and bounce chamber 61 is first established through relief passage 115, due to an initial surge of air from counterchamber 63 to bounce chamber 61.

The major-diameter portion 59 of piston 27 passes by relief passage 115, sealing off counterchamber 63. This corresponds to the location of B in FIG. 16. At this time, pressure in counterchamber 63 rises rapidly, until the piston reaches top dead point position, shown by FIG. 11, and the location of A in FIG. 16. At about this position, combustion occurs and drives the piston downward on the power stroke.

Figure 12:
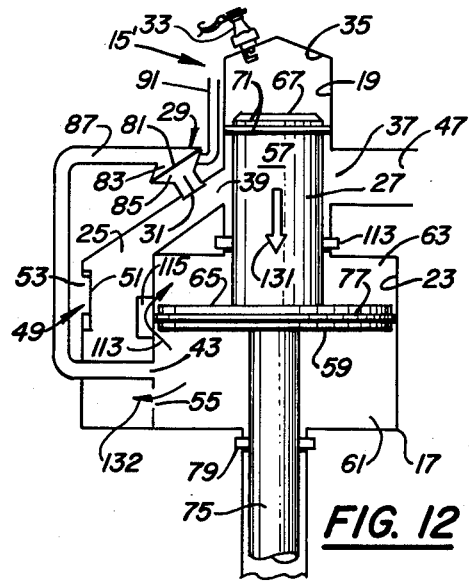

As the piston 27 proceeds downward on the power stroke, indicated by arrow 131 in FIG. 12, the pressure in bounce chamber 61 begins to rise. Air is forced from bounce chamber 61 into air box 25 (as indicated by the arrow 132) pressurizing the air box and providing a source of air for the power cylinder when inlet port 37 is opened. In FIG. 12, major-diameter portion 59 of piston 27 is opposite relief passage 115 and air is being transferred from bounce chamber 61 to counterchamber 63 through relief passage 115 (as indicated by the arrow 133). Since, as was stated before, the available volume of bounce chamber 61 is larger than the available volume of counterchamber 63, the pressure in bounce chamber 61, counterchamber 63, and air box 25 continues to rise.

Inlet port 39 eventually opens (shown in FIG. 13 and at E in FIG. 16) and the air is transferred from air box 25 to power cylinder 19. When the major-diameter portion 59 passes beyond relief passage 115, the pressure in counterchamber drops off so that as the major-diameter portion 59 passes timing port 43, there is again a reduction of pressure in actuator chamber 83 (indicated by arrow 135), so that some additional fuel enters fuel injector 29.

Figure 13:
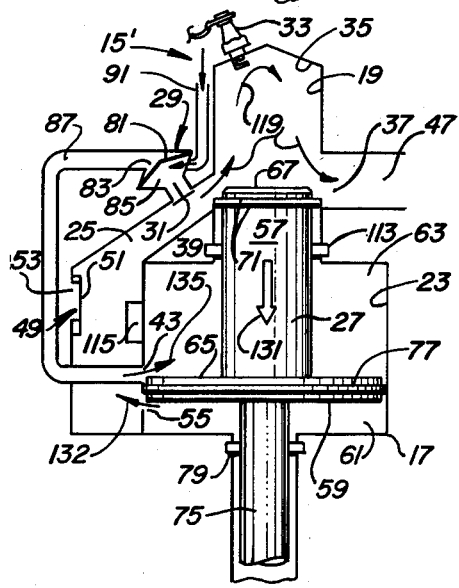

As the piston 27 moves from the position shown in FIG. 13 to position shown in FIG. 7, the port 55 is closed, sealing off the bounce chamber so that the pressure in the bounce chamber rises rapidly to provide rebound energy for the compression stroke. The various movements of the air are then repeated on each succeeding cycle of the engine.

From the foregoing description, it is seen that this invention includes a fuel supply, scavenge air, and control system integrally constructed with a free-piston engine having the essentially normal engine parts arranged to serve as a part of the system, so that much of the extra moving parts and auxiliary structure of conventional construction is eliminated.

It will be understood, of course, that, while the forms of the invention herein shown and described constitute the preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of

What is claimed is:
1. In a free-piston internal-combustion engine:
 (a) a frame;
 (b) an air chamber on said frame communicating with the power cylinder of said engine;
 (c) a fuel injector communicating with the power cylinder of said engine; and
 (d) unitary means, connected to said air chamber and fuel injector and actuated by piston reciprocation, providing, in combination, air at superatmospheric pressure for controlling length of piston stroke, for actuating said fuel injector and for said air chamber.

2. In a free-piston internal-combustion engine:
 (a) a frame;
 (b) an air chamber on said frame communicating with the power cylinder of said engine;
 (c) a fuel injector communicating with said power cylinder;
 (d) a conrtol cylinder having parts communicating with said air chamber and said fuel injector; and
 (e) means in said control cylinder actuated, by piston reciprocation providing in combination, air at superatmospheric pressure for controlling length of piston stroke, for actuating said fuel injector and for said air chamber.

3. In a free-piston internal-combustion engine:
 (a) a frame;
 (b) a power cylinder interconnected to a coaxial, control cylinder in said frame;
 (c) fuel injection means connected to said power cylinder and having pressure responsive actuator means communicating with said control cylinder;
 (d) an air box on said frame having an intake check valve;
 (e) first communication means between said air box and said power cylinder;
 (f) second communication means between said air box and said control cylinder; and
 (g) a piston reciprocable in said cylinders having a power piston portion reciprocable in said power cylinder attached to a control piston portion reciprocable in said control cylinder dividing said control cylinder into a first chamber to provide rebound energy for said piston at the end of the power stroke and a second chamber to provide rebound energy for said piston at the end of the compression stroke and whereby the reciprocation of said control piston provides pressure to said actuator means for actuating said fuel injection means and, in combination with said first communication means, said second communication means and said intake check valve, pump air through said air box to said power cylinder.

4. In a free-piston internal-combustion engine:
 (a) a frame;
 (b) a power cylinder interconnected to a coaxial, control cylinder in said frame;
 (c) fuel injection means connected to said power cylinder and having pressure responsive actuator means communicating with said control cylinder;
 (d) an air box on said frame having an intake check valve;
 (e) a piston reciprocable in said cylinders having a power piston portion reciprocable in said power cylinder attached to a control piston portion reciprocable in said control cylinder providing pressure to actuate said fuel-injection means and dividing said control cylinder into a first chamber for providing rebound energy to said piston at the end of the power stroke and a second chamber for providing rebound energy at the end of said compression stroke;
 (f) a first port in said air box communicating with said power cylinder, positioned to be opened and closed by said power piston and open at the end of the power stroke of said piston; and
 (g) a second port in said air box communicating with said control cylinder whereby the reciprocation of said control piston pressurizes the air in said air box prior to said first port being opened and draws air into said air box through said check valve on the compression stroke of said piston subsequent to said first port being closed.

5. In a free-piston internal-combustion engine:
 (a) a frame;
 (b) a power cylinder in said frame having a closure at one end and a coaxial interconnecting control cylinder in said frame;
 (c) a piston reciprocal in said cylinders having a power piston portion reciprocable in said power cylinder connected to a control cylinder portion reciprocal in said control cylinder, said control piston dividing said control cylinder into a counterchamber and a bounce chamber;
 (d) an air box on said frame having an intake check valve;
 (e) a pressure-actuated fuel injector having an actuator, said actuator having communication means to said control cylinder whereby pressure from said control cylinder activates said fuel injector to inject fuel during the compression stroke of said engine piston and to refill with fuel during the power stroke of said piston;
 (f) a first port between said air box and said power cylinder positioned to be opened and closed by passage of the head end of said power piston during reciprocation and to be open at the end of the power stroke of said piston whereby scavenge air is admitted to said power cylinder;
 (g) a second port between said air box and said control cylinder positioned to be opened and closed by passage of said control piston and closed at the end of said power stroke whereby said air box is pressurized through said second port from said control cylinder during a portion of said power stroke and reduced below atmospheric pressure by said control cylinder through said second port to fill from the atmosphere through said intake check valve during a portion of the compression stroke of said engine; and
 (h) said counter-chamber being closed to trap air at the end of said compression stroke and said bounce chamber being closed to trap air at the end of said power stroke.

6. In a free-piston internal-combustion engine:
 (a) a frame;
 (b) a power cylinder in said frame having a closure at one end;
 (c) a control cylinder in said frame, coaxial with said power cylinder;
 (d) an air box attached to said frame having an intake check valve communicating with the atmosphere;
 (e) a piston reciprocable in said cylinders having a power piston portion reciprocable in said power cylinder and a longitudinally spaced control piston portion reciprocable in said control cylinder, said control piston dividing said control cylinder into a counterchamber for providing rebound energy at the end of the compression stroke of said piston and a bounce chamber for providing rebound energy at the end of the power stroke of said piston;
 (f) a pressure-responsive fuel injector having a discharge aperture into said power cylinder and an actuator chamber communicating with a timing port in said power cylinder;
 (g) an intake port in said power cylinder communicating with said air box and positioned to be opened at about bottom dead center position of said piston;
 (h) a spill port in said power cylinder between said timing port and said intake port and communicating with said air box;

(i) a recess on the outer periphery of said power piston from a position near the control piston to an intermediate position removed from the end of said power piston in communication with said power cylinder, the leading edge of said recessed portion uncovering sequentially said timing port and said spill port on reciprocation of said piston actuating said fuel injector by means of the pressure change in said counterchamber; and (j) a communication port in said bounce chamber communicating with said air box so that pressure changes in said bounce chamber are transferred to said air box drawing air into said air box through said intake check valve on the compression stroke of said engine until said spill port is uncovered by the leading edge of said recessed portion and pressurizing the air in said air box after the leading edge of said recessed portion has closed said spill port and until said intake port is opened by said power piston, said communication port being closed by said control piston at about bottom dead center position of said piston.

7. In a free-piston internal-combustion engine:

(a) a frame;
(b) a power cylinder in said frame having a closure at one end;
(c) a control cylinder in said frame, coaxial with said power cylinder;
(d) an air box attached to said frame having an intake check valve communicating with the atmosphere;
(e) a piston reciprocable in said cylinders having a power piston portion reciprocable in said power cylinder and a longitudinally spaced control piston portion reciprocable in said control cylinder, said control piston dividing said control cylinder into a counterchamber for providing rebound energy at the end of the compression stroke of said piston and a bounce chamber for providing rebound energy at the end of the power stroke of said piston;
(f) an intake port in said power cylinder communicating with said air box and positioned to be opened at about bottom dead center position of said piston;
(g) a pressure-responsive fuel injector having a discharge aperture into said air box at a position adjacent to said intake port and an actuator chamber communicating with a timing port in said control cylinder said actuator chamber activating said fuel injector in response to pressure changes in said control cylinder;
(h) a recess in the wall of said control cylinder positioned to transfer air from said counterchamber to said bounce chamber during substantially the middle portion of the compression stroke and to transfer air from said bounce chamber to said counterchamber during the middle portion of the power stroke of said engine; and
(i) a communication port between said control chamber and said air box communicating with said bounce chamber so that pressure changes in said bounce chamber are transferred to said air box drawing air into said air box through said intake check valve on the compression stroke of said engine until said control piston is opposite said recess and pressurizing said air box after said control piston has passed said recess on the power stroke of said engine until said control piston passes said communication port at substantially bottom dead center position of said piston.

References Cited in the file of this patent

UNITED STATES PATENTS 3,042,010    McCrory              July 3, 1962

FOREIGN PATENTS 692,863    Germany              June 27, 1940